April 14, 1942.  C. T. LANGMAID  2,279,574

CLINCH-NUT AND METHOD OF MAKING

Filed July 18, 1940

Fig. 7.

INVENTOR.
Charles T. Langmaid
BY Edward M. Apple
ATTORNEY.

Patented Apr. 14, 1942

2,279,574

UNITED STATES PATENT OFFICE 2,279,574

CLINCH NUT AND METHOD OF MAKING

Charles T. Langmaid, Detroit, Mich., assignor to Fabristeel Products, Inc., Detroit, Mich., a corporation of Michigan Application July 18, 1940, Serial No. 346,221

3 Claims. (Cl. 10—86)

This invention relates to clinch-nuts and has particular reference to an improved clinch-nut and the method of forming the same.

In assembling automobiles and other articles of manufacture, it is necessary to provide threaded apertures in certain pieces, so that other elements may be attached thereto with facility.

It is now the practice, particularly in the automobile industry, to punch holes in the metal at required places and insert therein nuts which can be secured to the metal by riveting or similar means.

Many types of nuts have been developed for this purpose. Some of the nuts heretofore known have been comparatively expensive to manufacture. It is, therefore, one of the objects of this invention to disclose an improved clinch-nut which may be manufactured at great savings over the present known methods, particularly the method of forming the "cage" type of clinch-nut where the nut body is substantially enclosed within a cage, which comprises the clinch-on element.

Another object of the invention is to provide a clinch-nut which may be fabricated by using a standard nut, attaching thereto an element that may be readily clinched without disturbing the nut body itself.

A further object of the invention is the provision of a clinch-nut which may be formed without the necessity of having expensive machining operations performed on it.

A further object of the invention is the provision of a method of fabricating clinch-nuts whereby the nut body may be of standard form and the clinch-on portions of the nuts may take a variety of different shapes in order to accommodate the different types of apertures formed in the metal to which the nuts are to be attached.

The foregoing objects and other advantages of the invention will become more apparent as the description proceeds, reference being made from time to time to the accompanying drawing, wherein:

Fig. 7 is a view of a fragment of a special section of metal from which a nut having a modified form of body may be made. In this modification the nut body is provided with concave side walls.

Figure 1:
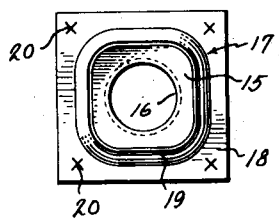
Fig. 1 is a plan view of a clinch-nut embodying my invention.

Referring now more particularly to the drawing, it will be understood that my improved clinch-nut consists of a conventional nut body 15, having a threaded aperture 16 and having secured thereto, a clinch-on portion 17 which consists of an integral member having a flange 18 and a collar portion 19. The flange portion 18 is secured to the nut body 15 by welding, as at 20. During the welding operation, the parts are held in such relative positions that the center of the opening in the collar is in alignment with the center of the threaded aperture of the nut.

Figure 4:
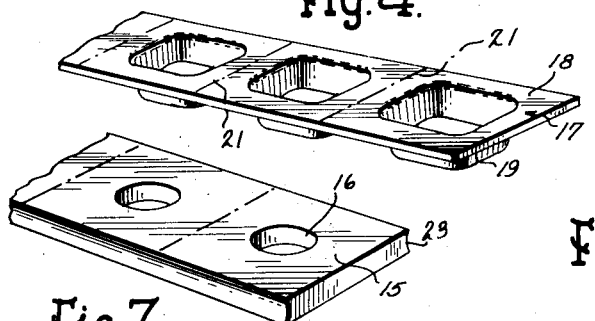
Fig. 4 is a perspective view of a strip of metal after it has been drawn to form a plurality of clinch-on elements, and before the elements are separated one from the other.

In practice, I prefer to form the clinch-on portions 17 out of a strip of metal such as illustrated in Fig. 4. The collar portions 19 are formed by drawing the metal as shown in Fig. 4. The clinch-on elements are then separated from one another in the forming operation, along the dotted lines 21.

Figure 2:
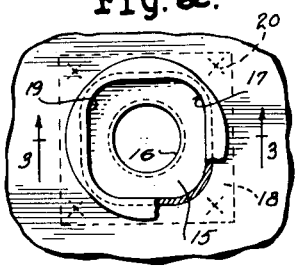
Fig. 2 is a plan view showing the nut illustrated in Fig. 1, attached to a fragment of metal.
Figure 3:
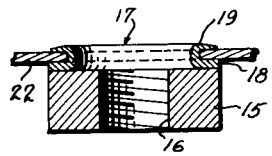
Fig. 3 is a section taken substantially on the line 3—3 of Fig. 2.

In Figs. 2 and 3, I illustrate the manner in which the completed clinch-nut may be attached to a metal apertured plate 22 by inserting the collar 19 over the edges of the apertured plate 22 in order to effect a permanent fastening.

Figure 5:
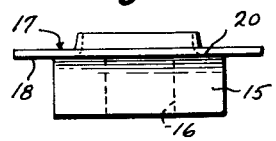
Fig. 5 is a side elevation of a modified form of my improved clinch-nut, in which the base flange of the clinch-on element is shown extending beyond the edges of the nut body.
Figure 6:
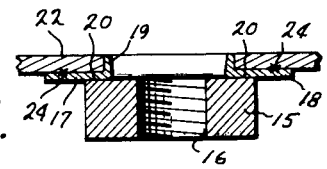
Fig. 6 is a sectional view illustrating the manner in which the nut shown in Fig. 5 may be attached to a metal plate in another manner, whereby a flush joint is effected between the upper surface of the plate and the collar.
Figure 8:
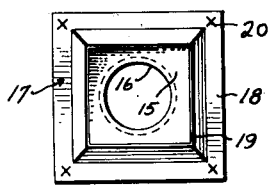
Figs. 8, 9, 10, 11 and 12 are plan views of nuts having modified forms of clinch-on portions to accommodate different types of plate apertures.
Figure 9:
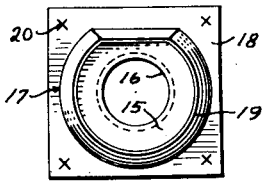
Figure 10:
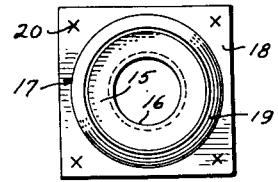
Figure 11:
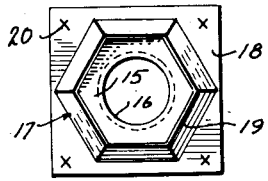
Figure 12:
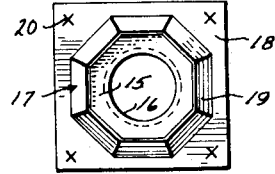

In Fig. 5, I illustrate a modified form of nut in which a conventional nut body 15 has secured to it by welding, as at 20, a clinch-on element 17, which is provided with a flange 18 which is substantially larger than the nut body 15. This is advantageous in certain applications where the metal to which the clinch-nut is to be secured is comparatively thin, and in which application it is often found that the nuts are pulled through the apertures of the metal in the attaching operation. The purpose of this enlarged flange 18 in this embodiment is to prevent the nuts from being bodily pulled through the apertures in the plate or other member to which the nuts are to be secured.

The modification illustrated in Fig. 5 has a further use and advantage in applications where it is desirable to have the upper surface of the collar 19 flush with the upper surface of the plate 22 to which the nut is to be attached. In this application the clinch-on portion 17 is welded, as at 20, to the nut body 15 in the same manner as illustrated in Fig. 2, but in this application the enlarged flange 18 is welded, as at 24, to the underside of the plate 22. In this application the walls 19 of the clinch-on portions may be outwardly expanded to tightly engage the inner walls of the aperture in the plate 22.

In Fig. 7 I illustrate a special section of a strip of metal from which nut bodies may be formed. In this embodiment the nut bodies are provided with concave side walls 23 which facilitate the holding of the nuts in the welding machines during the operation of welding the clinch-on elements 17 to the nut body 15.

In Figs. 8 to 12 inclusive, I illustrate various modifications in which conventional nut bodies 15 may be employed. In these embodiments the clinch-on elements are provided with the usual flanges 18, but the collars 19 are of different shapes to accommodate different shaped apertures in the plates or other elements to which they are to be attached.

In all of the embodiments described, it will be noted that the collar portions 19 are slightly tapered in order to facilitate the entry of the collars into the plate apertures.

Having described my invention, what I claim and desire to secure by Letters Patent is:

1. The combination with a standard shaped nut, of a clinch-on element comprising a flat member having an area substantially the size of one surface of the nut body, the said flat member having an outwardly drawn central portion, the said flat member being secured to the nut by welding at points adjacent said drawn central portion.

2. The combination defined in claim 1, in which the drawn central portion has tapered outside walls.

3. The method of forming a clinch-on nut which consists of providing a conventional nut having at least one flat surface, stamping out a comparatively thin piece of metal having an area at least the area of the flat surface of the nut, drawing outwardly the central portion of said thin piece of metal to form a collar having tapered outside walls, and then securing by spot welding the thin piece of metal to the nut surface.

CHARLES T. LANGMAID.